United States Patent [19]
Sugiyama et al.

[11] Patent Number: 6,111,383
[45] Date of Patent: Aug. 29, 2000

[54] CONTROLLER FOR FEEDING CHOPPED ELECTRICITY

[75] Inventors: Masanori Sugiyama; Chiaki Honma, both of Aichi-ken, Japan

[73] Assignee: Aisin Seiki Kabushiki Kaisha, Kariya, Japan

[21] Appl. No.: 09/259,260

[22] Filed: Mar. 1, 1999

[51] Int. Cl.$^7$ .................................................. G05B 11/28
[52] U.S. Cl. ..................... 318/599; 318/568.22; 318/606; 318/632; 318/635; 318/638
[58] Field of Search ............................... 318/599, 568.22, 318/606, 632, 635, 638

[56] References Cited

U.S. PATENT DOCUMENTS

| | | | |
|---|---|---|---|
| 3,611,105 | 10/1971 | Sautel et al. | 318/599 |
| 3,659,168 | 4/1972 | Salihi et al. | 318/599 |
| 4,104,946 | 8/1978 | Peterson | 318/599 |

*Primary Examiner*—Karen Masih
*Attorney, Agent, or Firm*—Sughrue, Mion, Zinn, Macpeak & Seas, PLLC

[57] ABSTRACT

A rising saw tooth signal generating circuit generates a rising saw tooth signal having a constant amplitude and a constant period which corresponds to a frequency being slightly higher than the human audible frequency range. The rising saw tooth signal generating circuit also generates a binary signal which generates a reference chopping timing synchronizing with the rising saw tooth signal. The rising saw tooth signal is inverted and a descending saw tooth signal is generated. The descending saw tooth signal is added to the reference current signal and a binary signal is generated by the result of the comparison between the addition signal and the actual current signal. A flip-flop generates a signal which reaches a low level whenever the binary signal is descended and which reaches a high level whenever the reference chopping timing comes. A further binary signal which moves to the high level at the feeding of the current and the signal are supplied to the AND gate. The output signal of the AND gate and the signal is supplied to an AND gate and a binary signal for driving a switching element is obtained.

16 Claims, 10 Drawing Sheets

CONTROLLER FOR FEEDING CHOPPED ELECTRICITY

BACKGROUND OF THE INVENTION

1. Field of the Invention

The present invention relates to a controller for feeding chopped electricity, and more particularly to a controller for feeding chopped electricity to a load such as an electric motor.

2. Description of the Prior Art

In general, in the control of the level of the current flowing through a load such as a coil of an electric motor, the load is connected to a direct current electric source via a switching element such as a transistor and a value of the current flowing through the coil is detected by a resistor or the like. The detected current value is compared with a predefined reference current value in a binary fashion. When the reference current value is greater than the detected current value, the switching element is turned on. On the other hand, when the reference current value equals or falls below the detected current value, the switching element is turned off. Thereby, the switching element repeats ON and OFF, so that the average value of the current practically flowing through the load is controlled to a value corresponding to or close to the reference current value.

As disclosed in Japanese Patent Application Laid-Open Publication No. 8 (1996)-17S793, in the controller for feeding chopped electricity of this kind, the higher the ON/OFF frequency (chopping frequency) of the switching element, the more the energy loss increases in the switching element and other components, thus increasing calorific power. Therefore, it is not preferable to increase the chopping frequency so much. When the chopping frequency is too low, a difference between the reference current value and the practical current value increases, thus dropping the accuracy of the control. Further, it is not preferable for the chopping frequency to fall within the human audible frequency range because mechanical vibrations caused by the chopping of the current sounds as noise to human ears.

The controller for feeding chopped electricity is generally designed so that the chopping frequency is a value (e.g. 15 KHz) slightly higher than the upper limit of the human audible frequency range. However, in the case that the switching element is turned on or off by means of the binary signals obtained by the simple comparison between the reference current value and the practical current value, the chopping frequency changes and therefore it is not possible to expect a stable operation. Since the impedance of the coil changes with the change of the rotational angle of a rotor, the slope, of a rising curve of the current at the ON condition of the switching element and the slope of a descending curve of the current at the OFF condition of the switching element vary and therefore the chopping frequency varies. After all, the increase of the calorific power and the generation of the noise are caused with the variation of the impedance of the coil. Further, if there is scatter of the characteristics of the controller, abnormal calorification or abnormal noise is generated.

In the above mentioned Japanese Patent Application Laid-Open Publication No. 8 (1996)-17S793, two controllers for feeding chopped electricity which stabilize the chopping frequency are disclosed therein. In these controllers, a first signal corresponding to a current which is chopped and which actually flows through the load is compared with a second signal defining a reference current value and a binary signal corresponding to the result of the comparison is utilized for controlling ON/OFF energization of the load. According to one of these controllers, an ON/OFF signal which is supplied to an element for switching the load (a switching element) is turned to off, when the actual current value exceeds the reference current value. Further, whenever a period of the ON/OFF signal becomes a constant reference chopping timing (e.g. 15 kHz), the actual current value is compared with the reference current value. When the reference current value is greater than the actual current value, the ON/OFF signal is turned to on. On the contrary, when the reference current value equals to or falls below the actual current value, the ON/OFF signal is maintained in the off status. On the other hand, the other controller includes means for generating a reference chopping timing which is generated with approximately constant period, means for generating an enable flag signal which is set to a first level whenever the binary signal is turned from on status to off status and which is set to a second level whenever the period of the ON/OFF signal becomes the reference chopping timing and prohibition means for prohibiting the turning on from off status of the ON/OFF signal while the enable flag signal is in the first level.

Figure 3:
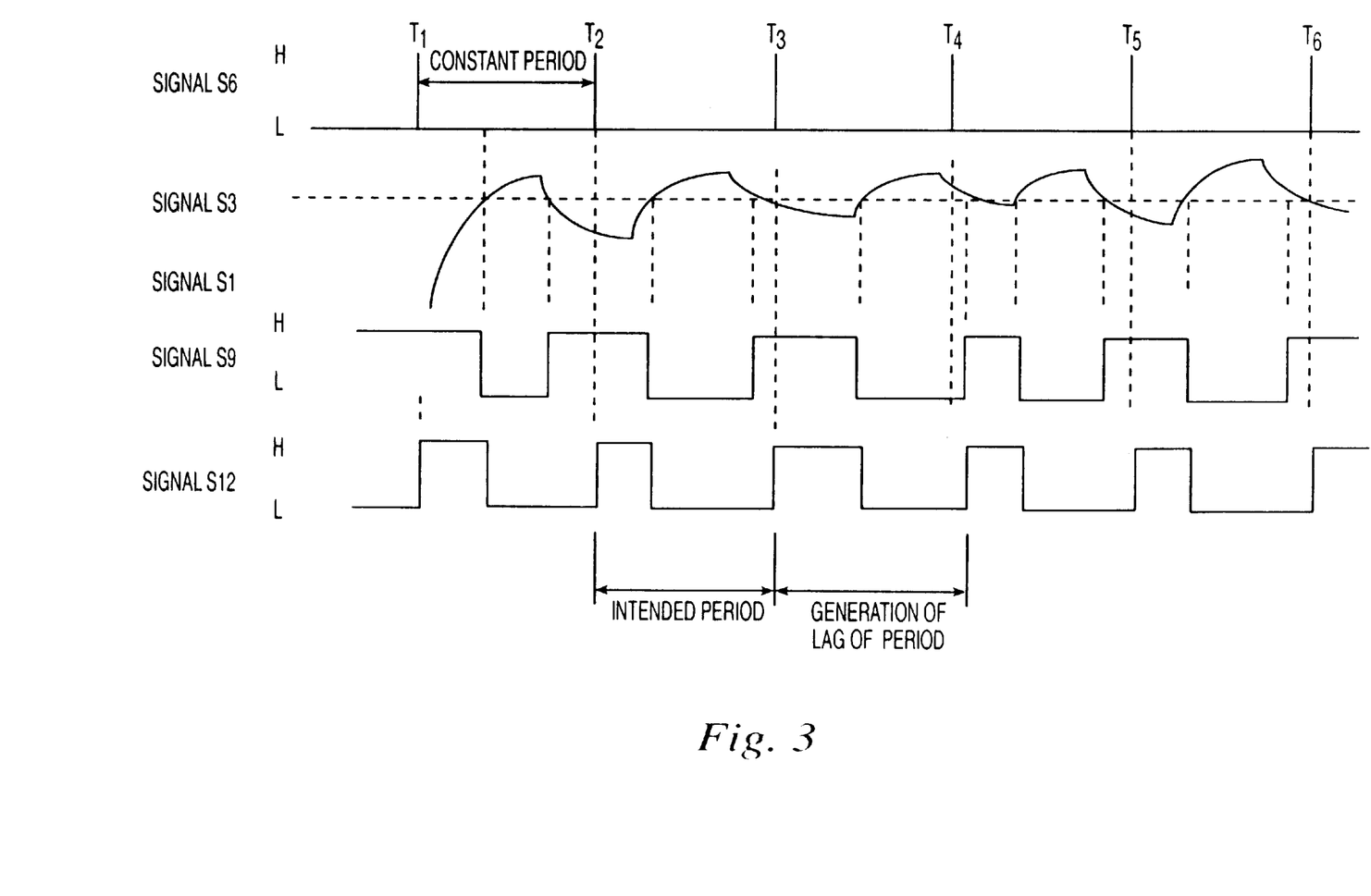
FIG. 3 is a time chart showing an operation of a prior art controller.

When the controller for feeding chopped electricity disclosed in the above publication is applied for controlling a current which flows through coils of a switched reluctance motor, the impedance of the coils wound on poles of a stator is changed with a change of a rotational angle of & rotor. Thus the slope of a rising curve of the actual current value and the slope of a descending curve of the actual current with respect to the turning on or off of the current flowing through the coils are varied as shown in FIG. 3. In FIG. 3, a signal S1 is an actual current signal, a signal 53 is a reference current signal, a signal S6 is a reference chopping timing signal, a signal S9 is a signal which is generated by the result of the comparison between the signals S1 and S3 and a signal S12 is a switching element driving signal. Thus a status in which the actual current value, still exceeds the reference current is generated as the reference timing T4 and the off status of the current flowing through the coils which is started before the reference timing T4 is continued until the actual current value falls below the reference current after the reference timing T4. As a result, there is a case in which the time required for that the current flowing through the coils is turned to off from off status after the current flowing through the coils is turned to on from off status at the reference timing T3 and is turned again to on from off status becomes longer than the period of the reference chopping timing. Thus objectionable acoustic noise is generated.

SUMMARY OF THE INVENTION

It is, therefore, an object of the present invention to provide an improved controller for chopped electricity which overcomes the above drawbacks.

It is another object of the present invention to provide an improved controller for chopped electricity which can prevent the period of the turning of the current flowing through the load from being longer than the reference chopping timing.

In order to achieve these objectives, according to a first embodiment of the present invention, there is provided a controller for chopped electricity including means for generating an actual current signal which shows a current actually flowing through a load, means for generating a reference current signal which shows a reference current value that should flow through the load, timing generating means for generating a reference chopping timing having a constant period, means for generating a saw tooth signal which generates a descending saw tooth signal synchronizing with the reference chopping timing and having a constant amplitude, means for generating a compensation reference current signal by adding the descending saw tooth signal to the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than thin compensation reference current signal, enable flag signal generating means for generating an enable flag signal which is set to a first level whenever the binary signal is turned to off from on status and which is set to a second level whenever the reference chopping timing comes and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

According to a second embedment of the present invention, there is provided a controller for chopped electricity including means for generating an actual current signal shows a current actually flowing through a load, means for generating a reference current signal shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation reference current signal which generates a compensation reference current signal by subtracting the rising saw tooth signal from the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal, enable flag signal generating means for generating an enable flag signal which is set to a first level whenever the binary signal is turned to off from on status and which is set to a second level whenever the reference chopping timing comes and switching means which turns the feeding of the current to the load from, on status to off status in response to the switching of the binary signal from the first level to the second level during the enable flag signal is in the first level and which turns the feeding of the current to the load from off status to on status in response to the switching of the binary signal from the second level to the first level when the enable flag signal is in the second level.

According to a third embodiment of the present invention, there is provided a controller for chopped electricity including means for generating an actual current signal which shows a current actually flowing through a load, means for generating a reference current signal which shows a reference current value that should flow through the load, timing generating means for generating a reference chopping timing having a constant period, means for generating a saw tooth signal which generates a descending saw tooth signal synchronizing with the reference chopping timing and having a constant amplitude, means for generating a compensation actual current signal by substracting the descending saw tooth signal from the actual current signal, binary signal generating means for generating a binary signal which is set to a first level when the compensation actual current signal falls below the reference current signal by the result of the comparison between the compensation actual current signal and the reference current signal and which is set to a second level when the compensation actual current signal is greater than the reference current signal, enable flag signal generating means for generating an enable flag signal which is set to a first level whenever the binary signal is turned to off from on status and which is set to a second level whenever the reference chopping timing comes and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

According to a fourth embodiment of the present invention, there is provided a controller for chopped electricity including means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation actual current signal by adding the rising saw tooth signal to the actual current signal, binary signal generating means for generating a binary signal which is set to a first level when the compensation actual current signal falls below the reference current signal by the result of the comparison between the compensation actual current signal and the reference current signal and which is set to a second level when the compensation actual current signal is greater than the reference current signal, enable flag signal generating means for generating an enable flag signal which is set to a first level whenever the binary signal is turned to off from on status and which is set to a second level whenever the reference chopping timing comes and switching means which turns the feeding of the current to the load from on status to off status in response to the switching of the binary signal from the first level to the second level during the enable flag signal is in the first level and which turns the feeding of the current to the load from off status to on status in response to the switching of the binary signal from the second level to the first level during the enable flag signal is in the second level.

According to a fifth embodiment of the present invention, there is provided a controller for chopped electricity including means for generating an actual current signal which shows a current actually flowing through a load, means for generating a reference current signal which shows a reference current value that should be flown through the load, timing generating means for generating a reference chopping timing having a constant period, means for generating a saw tooth signal which generates a descending saw tooth signal synchronizing with the reference chopping timing and having a constant amplitude, means for generating a compensation reference current signal by adding the descending saw tooth signal to the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

According to a sixth embodiment of the present invention, there is provided a controller for chopped electricity including means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation reference current signal by subtracting the rising saw tooth signal from the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

According to a seventh embedment of the present invention, there is provided a controller for chopped electricity including means for generating an actual current signal which shows a current actually flowing through a load, means for generating a reference current signal which shows a reference current value that should be flown through the load, timing generating means for generating a reference chopping timing having a constant period, means for generating a saw tooth signal which generates a descending saw tooth signal synchronizing with the reference chopping timing and having a constant amplitude, means for generating a compensation reference current signal by subtracting the descending saw tooth signal from the actual current signal, binary signal generating means for generating a binary signal which is set to a first level when the compensation actual current signal falls below the reference current signal by the result of the comparison between the compensation current signal and the reference current signal and which is set to a second level when the compensation actual current signal is greater than the reference current signal and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

According to an eighth embodiment of the present invention, there is provided a controller for chopped electricity including means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amp, means for generating a compensation reference current signal by adding the rising saw tooth signal to the actual current signal, binary signal generating means for generating a binary signal which is set to a first level when the compensation actual current signal falls below the reference current signal by the result of the comparison between the compensation current signal and the reference current signal and which is set to a second level when the compensation actual current signal is greater than the reference current signal and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A controller for chopped electricity constituted in accordance with preferred embodiments of the present invention will be described with reference to attached drawings.

Figure 1:
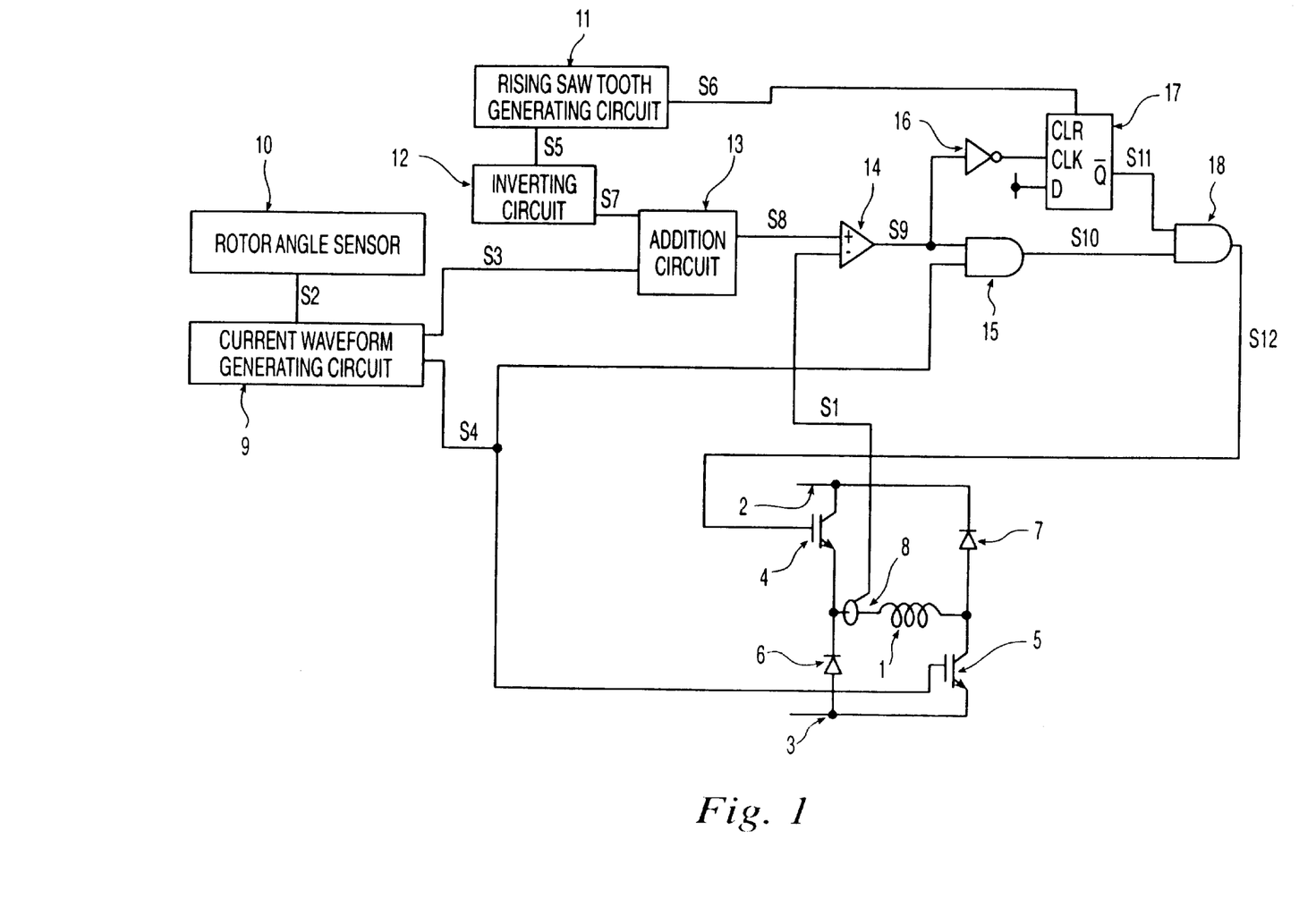
FIG. 1 is a block diagram showing the structure of a first embodiment of a controller for chopped electricity in accordance with the present invention.

FIG. 1 shows a structure of the controller according to a first embodiment of the present invention. In this first embodiment, the controller is utilized for controlling the current flowing through a first phase coil 1 of a switched reluctance motor having three phase coils. Referring to FIG. 1, the controller includes a first switching element 4 which is interposed between one end of the coil 1 and a high electric potential line 2 of a battery (not shown), a second switching element 5 which is interposed between the other end of the coil 3 and a low electric potential line 3 of the battery, a first diode 6 which is interposed between one end of the coil 1 and the low electric potential line 3 and which permits a current to conduct from the low electric potential line 3 to one end of the coil 1, a second diode 7 which is interposed between the other end of the coil 1 and the high electric potential line 2 and which permits a current to conduct from the other end of the coil 1 to high electric potential line 2 and a current sensor 8 which is interposed between the first switching element 4 and the coil 1 and which generates a signal (an analog signal) S1 showing an actual current value flowing through the coil 3. Each of the switching elements 4 and 5 is constituted by a gate insulated bipolar transistor (IGBT).

A current waveform generating circuit 9 generates a signal (an analog signal) S3 and a binary signal S4 on basis of a signal (a digital signal) S2 from a rotor angle sensor 10 detecting a rotational angle of a rotor (not shown) of the switched reluctance motor. The signal 23 shows a reference current value which should flow to the coil 2 at the detected rotor angle. The binary signal S4 reaches a high level H while the rotational angle of the rotor is in a range which is positioned from a first angle beginning to feed the current to the coil 1 to a second angle ending the feeding of the current to the coil 1. The binary signal S4 reaches a low level L when the rotational angle of the rotor is beyond the range. The reference current value corresponding to the rotational angle of the rotor, the first angle and second angle are determined in response to external demands concerning the operation of the switched reluctance motor and are changed in response to the change of the demands.

A rising saw tooth signal generating circuit generates a rising saw tooth signal (an analog signal) S5 having a constant period and a constant amplitude and a reference chopping timing signal S6 having a period which is synchronized to the rising saw tooth signal S5. The reference chopping timing signal S6 is a binary signal which momentarily change from a low level L via a high level H to the low level L whenever the time of the period elapses. The period of the reference chopping timing signal S6 is determined so as to be equal to a period of a frequency being slightly higher than the human audible frequency range. An inverting circuit 12 inverts the rising saw tooth signal S5 and generates a descending saw tooth signal S7. An adding circuit 13 adds the descending saw tooth signal S7 to the signal S3 and generates a compensation reference current signal S8.

A comparator circuit 14 compares the signal S1 with the compensation reference current signal S8 and generates a binary signal S9. When the signal S1 falls below the compensation reference current signal S8, the binary signal S9 reaches a high level H. When the signal S1 is greater than the compensation reference current signal S8, the binary signal S9 reaches a low level L.

The binary signal S9 is supplied to one of two input terminals of an AND gate 15. At the same time, the binary signal S9 is inverted and then is supplied to an input terminal CLK of a flip-flop 17. The signal S4 is supplied to the other input terminal of the AND gate 15. The signal S4 is also supplied to the second switching element 5. The switching element 5 is turned to ON (close), when the signal S4 is the high level H. The switching element 5 is turned to OFF (open), when the signal S4 is the low level L.

Figure 2:
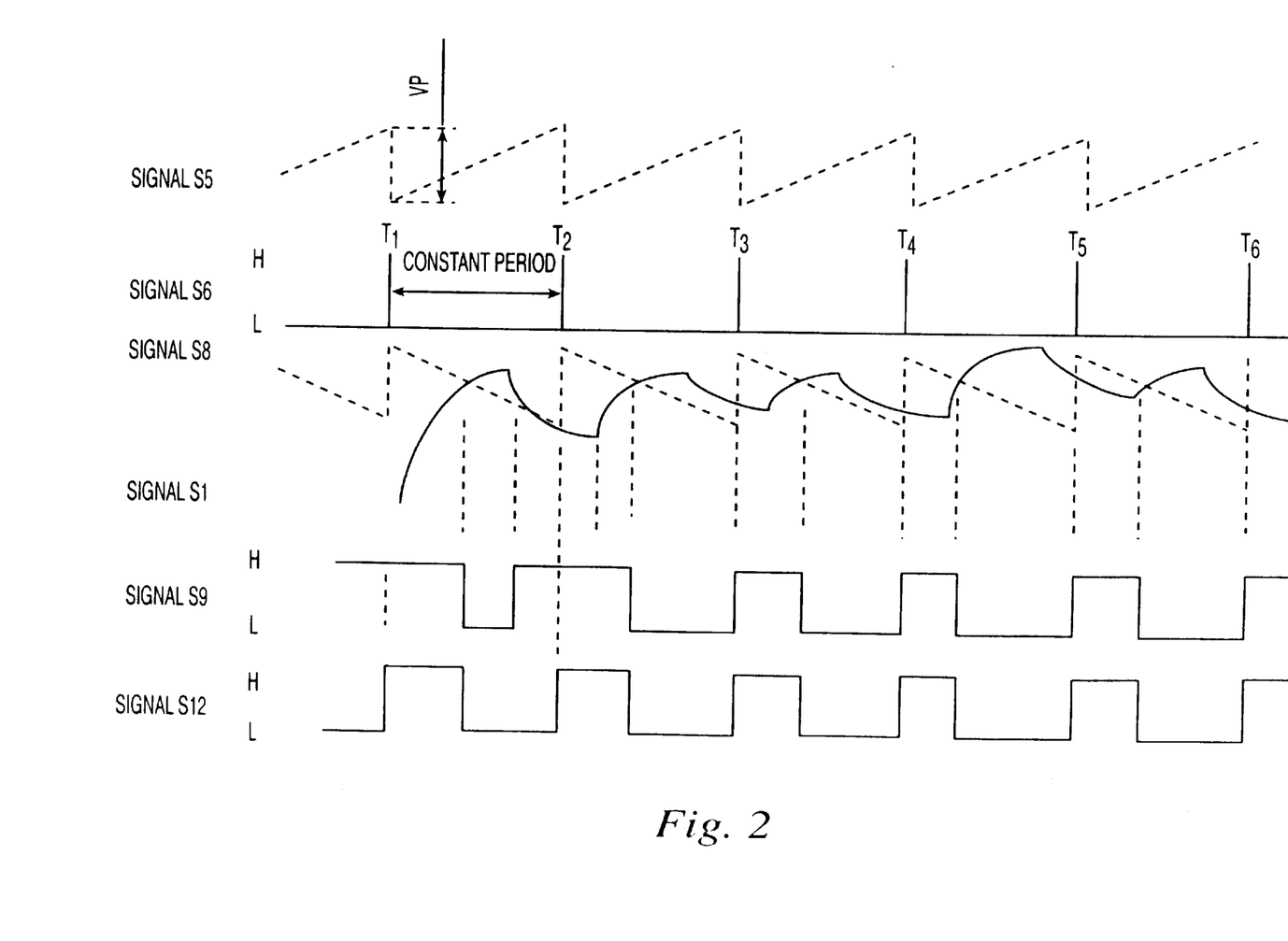
FIG. 2 is a time chart showing an operation of the controller shown in FIG. 1.

A binary signal S10 which is supplied from the AND gate 15 is supplied to one of two input terminals of an AND gate 18. A binary signal S11 which is supplied from an invert output terminal of the flip-flop 17 is supplied to the other input terminal of the AND gate 18. The reference chopping timing signal S6 is supplied to the other input terminal of the flip-flop 17. The binary signal S11 is turned from the high level H to the low level L in response to the descending of the signal S9 and is turned from the low level L to the high level H in response to the rising of the signal S6. In the condition in which the signal S9 is in the high level H, the binary signal S12 supplied from the AND gate 18 moves to the high level H when the binary signal S10 is in the high level H, and the binary signal S12 moves to the low level L when the binary signal S10 is in the low level L. The signal S12 is supplied to the first switching element 4. When the signal S12 is in the high level H, the first switching element 4 is turned to ON. When the signal S12 is in the low level L, the first switching element 4 is turned to OFF. When the signal S11 is in the high level H, the signal S12 is changed from the high level H to the low level L in response to the changing of the signal S10 from the high level H to the low level L and is changed from the low level L to the high level H in response to the changing of the signal S10 from the low level L to the high level H. However, when the signal S11 is in the low level L, even if the signal S10 is changed from the low level L to the high level H, the signal S12 is maintained to the low level L. As shown in FIG. 2, the amplitude VP of the voltage of the signal S5 is determined so as to be lower than an offset voltage of the signal SI supplied from the current sensor 8. The offset voltage corresponds to a voltage at which the actual current value flowing through the coil 1 is zero.

The above-described first embodiment of the present invention operates as follow:

Referring to FIG. 1 and FIG. 2, when the rotational angle of the rotor comes to the first angle at which the current begins to feed to the coil 1, the signal S4 is changed from the low level L to the high level H and thereby the second switching element 5 is turned to ON from the OFF status. Then, when the rotational angle of the rotor comes to the second angle at which the feeding of the current to the coil 1 end, the signal S4 is changed from the high level H to the low level L and thereby the second switching element 5 is turned to OFF from the ON status. When the first switching element 4 is turned to ON while the second switching element 5 is in the ON status, the current is supplied from the battery (not shown) to the coil 3. When the first switching element 4 is turned to OFF while the second switching element is in the ON status, the supply of the current from the battery to the coil 1 is stopped.

On the other hand, in the course of changing of the rotational angle of the rotor from the first angle to the second angle, whenever the rotational angle of the rotor detected by the rotor angle sensor 10 changes, the level of the signal S3 changes to a level showing the reference current value which corresponds to the rotational angle of the rotor. In a condition in which the rotational angle of the rotor positions before the first angle, the level of the signal S3 is zero and the amplitude VP of the signal S5 is smaller than the offset voltage of the signal S1. Thus, the compensation reference current value S8 which is added the level of the descending saw tooth signal S7 to the level of the signal S3 does not exceed over the level of the signal S1 and the signal S9 is in the low level L. When the feed of the current to coil 1 begins, the level of the signal S3 rises up and therefore the actual current value signal S1 falls below the compensation reference current signal S8. As a result, the signal S9 is changed from the low level L to the high level H and the signal S10 is changed from the low level L to the high level H. This changing of the signal S9 from the low level L to the high level H does not influence the output signal S11 of the flip-flop 17. Accordingly, the signal S11 is in the low level L and therefore the signal S12 is also in the low level L. When the reference chopping timing T1 comes, the signal S11 changes from the low level L to the high level H and both of to input signals of the AND gate 18 become to the high level H. Thus, the signal S12 is changed from the low level L to the high level H and the first switching element 4 is turned to ON. As a result, the current is supplied from the battery to the coil 1.

When the actual current value flowing through the coil 1 increases and the level of the signal S1 exceeds over the level of the compensation reference current signal S8, the signal S9 is changed from the high level H to the low level L and the signal S11 supplied from the flip-flop 17 is changed from the high level H to the low level L. Thus, the signal S12 is changed from the high level H to the low level L and the first switching element 4 is turned to OFF from the ON status. As a result, the supply of the current to the coil 1 is stopped. At this time, although the first switching element 4 turns to OFF from the ON status, the value of the current actually flowing through the coil 1 continues to increase for a while because there is a time lag until the first switching element 4 is completely turned to OFF from the ON status. When the value of the current flowing through the coil begins to decrease after the first switching element 4 is turned to OFF from the ON status and the level of the signal S1 falls below the level of the signal S8, the signal S9 is changed from the low level L to the high level H. When this changing of the signal S9 occurs before the reference chopping timing T2, since the signal S11 is in the low level L, the signal S12 does not change from the low level L to the high level H and therefore the first switching element 4 maintains the OFF status. When the reference chopping timing T2 comes, the signal S11 is changed from the low level L to the high level H and both of two inputs of the AND gate 18 become to the high level H. Thus the signal S12 is changed from the low level L to the high level H and the first switching element 4 is turned to ON from the OFF status. As a result, the current is supplied from the battery to the coil 1 and the value of the current flowing through the coil 1 is increased again. After that, when the signal S1 exceeds over the signal S8, the signal S9 is changed from the high level H to the low level L and the signal S11 is changed from the high level H to the low level L.

As shown in FIG. 2, since the compensation reference current signal S8 is produced by adding the descending saw tooth signal S7 to the reference current signal S3, when each of the reference chopping timings T1, T2, T3, T4, T5 and T6 comes, the compensation reference current signal SB rises momentarily with the level VP. Therefore, although the signal SB exceeds over the signal S3 when each of the reference chopping timings T3, T4 and T5 comes, if the level of the excess is less than the level VP, the signal S9 changes from the high level H to the low level L and therefore the signal S11 changes from the low level L to the high level H. Therefore, when each of the reference chopping timings T1, T2, T3, T4, T5 and T5 comes, the signal S12 changes from the low level L to the high level H and the first switching element 4 is turned to ON from the OFF status. Accordingly, it prevents the period of ON/OFF control for feeding the current to the coil 1 from becoming longer than the period of the reference chopping timing and thereby prevents the objectionable acoustic noise from being generated.

Figure 4:
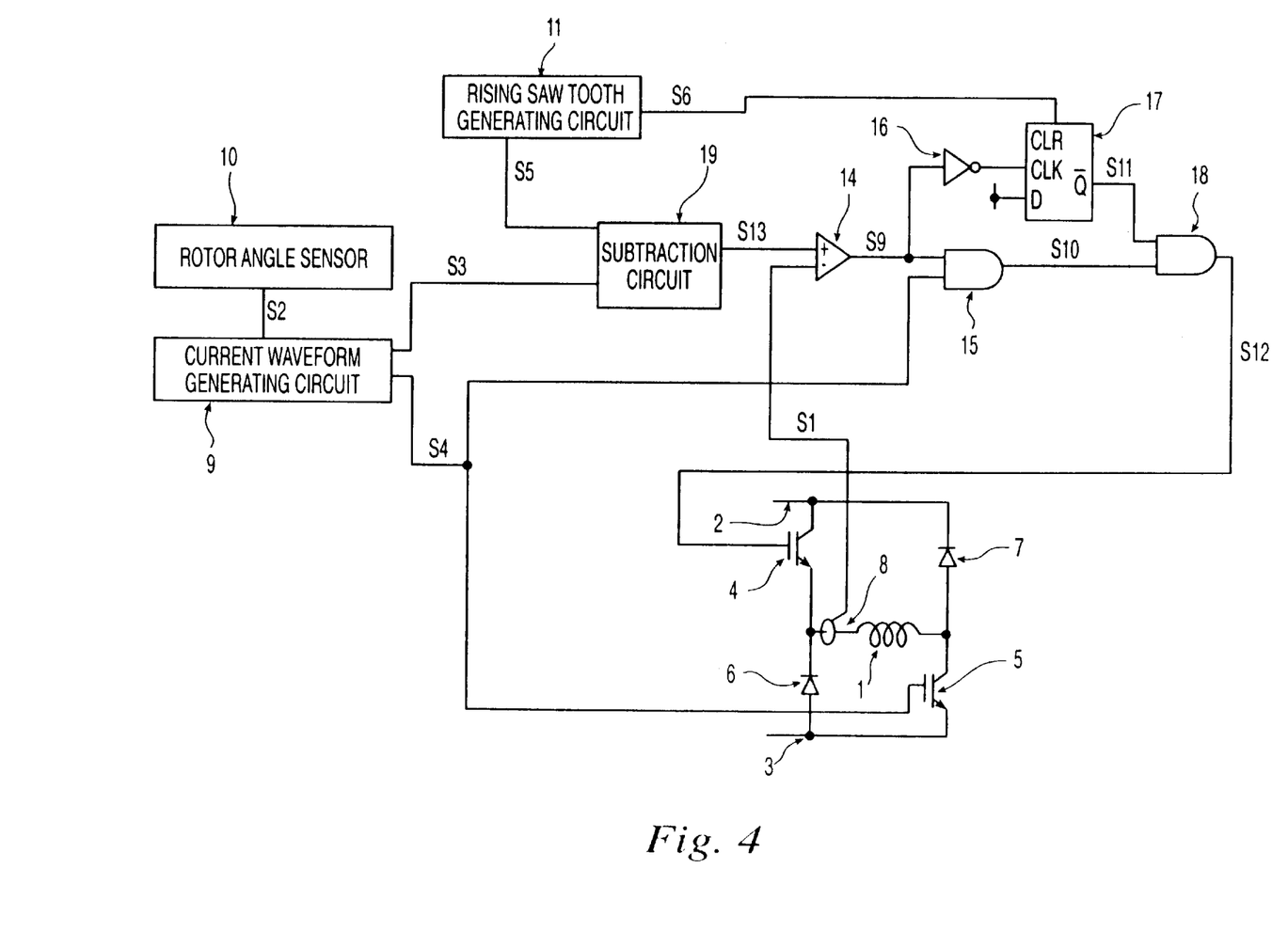
FIG. 4 is a block diagram showing the structure of a second embodiment of a controller for chopped electricity in accordance with the present invention.

FIG. 4 shows a structure of the controller according to a second embodiment of the present invention. In this second embodiment, the controller is utilized for controlling the current flowing through a first phase coil 1 of a switched reluctance motor having three phase coils. The second embodiment differs from the first embodiment shown in FIG. 1 only in the following structures. In the second embodiment, the rising saw tooth signal S5 is subtracted from the reference current signal S3 by a subtraction circuit 19 and a compensation reference current signal S13 is produced as a result of this subtraction. Further, the compensation reference current signal S13 is compared with the actual current signal S1 by the comparator circuit 14 and a binary signal 59 is produced by the result of this comparison. In this second embodiment, it is possible to obtain the same effects as the above first embodiment.

Figure 5:
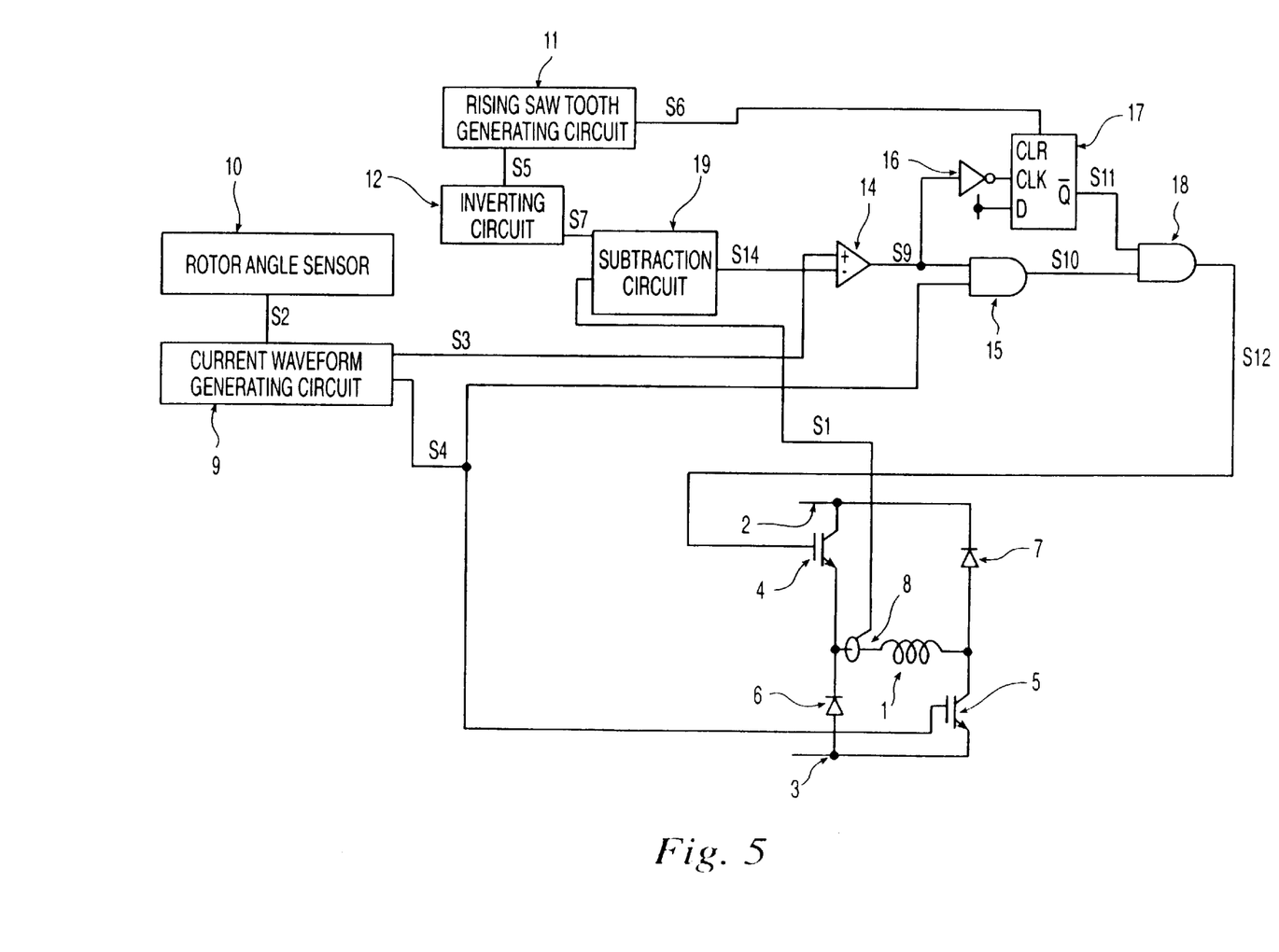
FIG. 5 is a block diagram showing the structure of a third embodiment of a controller for chopped electricity in accordance with the present invention

FIG. 5 shows a structure of the controller according to a third embodiment of the present invention. In this third embodiment, the controller is utilized for controlling the current flowing through a first phase coil 1 of a switched reluctance motor having three-phase coils. The third embodiment differs from the first embodiment shown in FIG. 1 only in the following structures. In the third embodiment, the descending saw tooth signal S7 is subtracted from the actual current signal S3. by a subtraction circuit 19 and a compensation actual current signal S14 is produced as a result of this subtraction. Further, the compensation actual current signal S14 is compared with the reference current signal S3 by the comparator circuit 14 and a binary signal S9 is produced as a result of this comparison. In this third embodiment, it is able to obtain the same effects as the above first embodiment.

Figure 6:
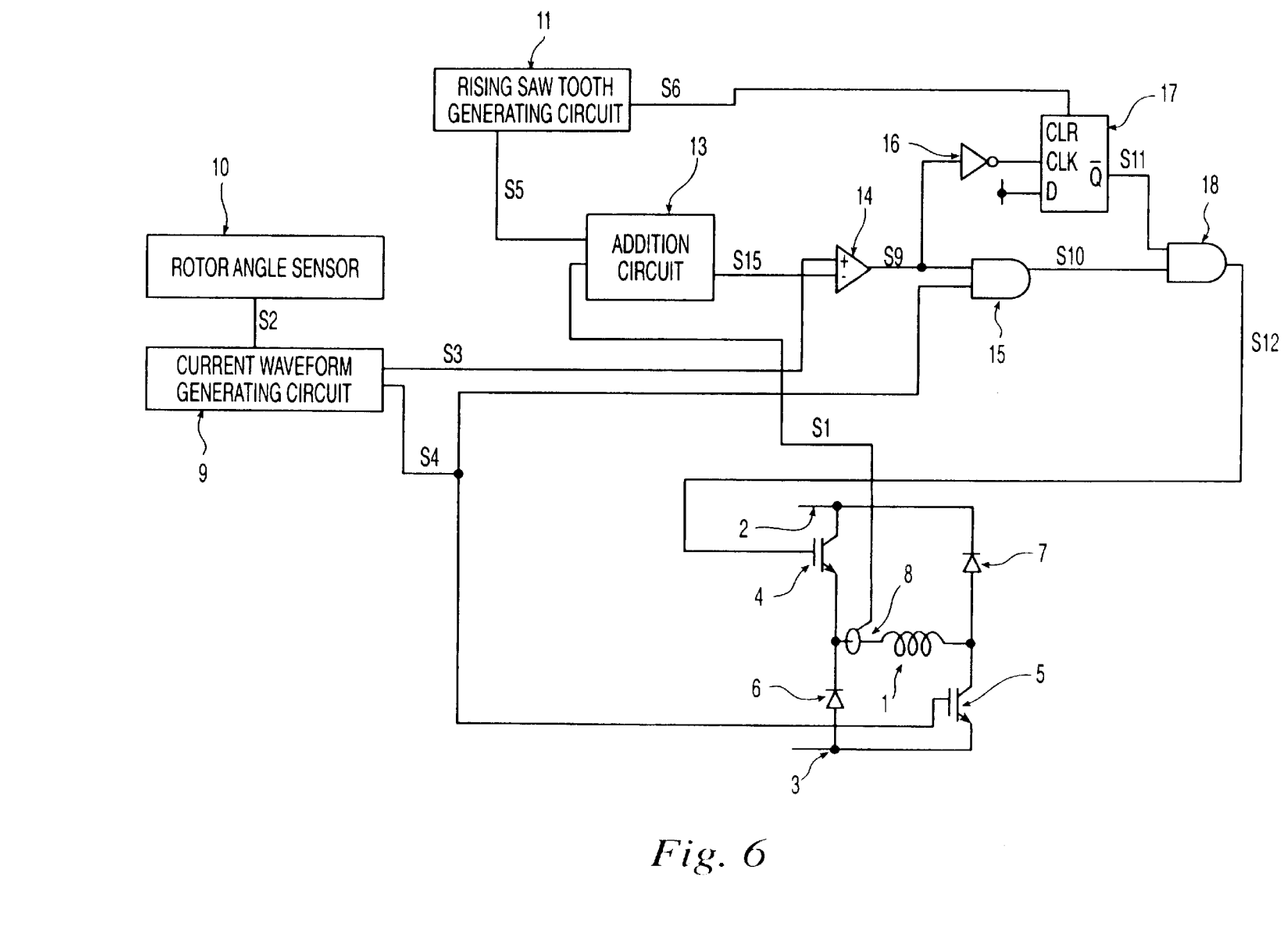
FIG. 6 is a block diagram showing the structure of a fourth embodiment of a controller for chopped electricity in accordance with the present invention.

FIG. 6 shows a structure of the controller according to a fourth embodiment of the present invention. In this fourth embodiment, the controller is utilized for controlling the current flowing through a first phase coil 1 of a switched reluctance motor having three phase coils. The fourth embodiment differs from the first embodiment shown in FIG. 1 only in the following structures. In the fourth embodiment, the rising saw tooth signal 35 is added to the actual current signal S1 by an addition circuit 13 and a compensation actual current signal S14 is produced as a result of this addition. Further, the compensation actual current signal S14 is compared with the reference current signal S3 by a comparator circuit 14 and a binary signal S9 is produced as a result of this comparison. In this fourth embodiment, it is able to obtain the same effects as the above first embodiment.

Figure 7:
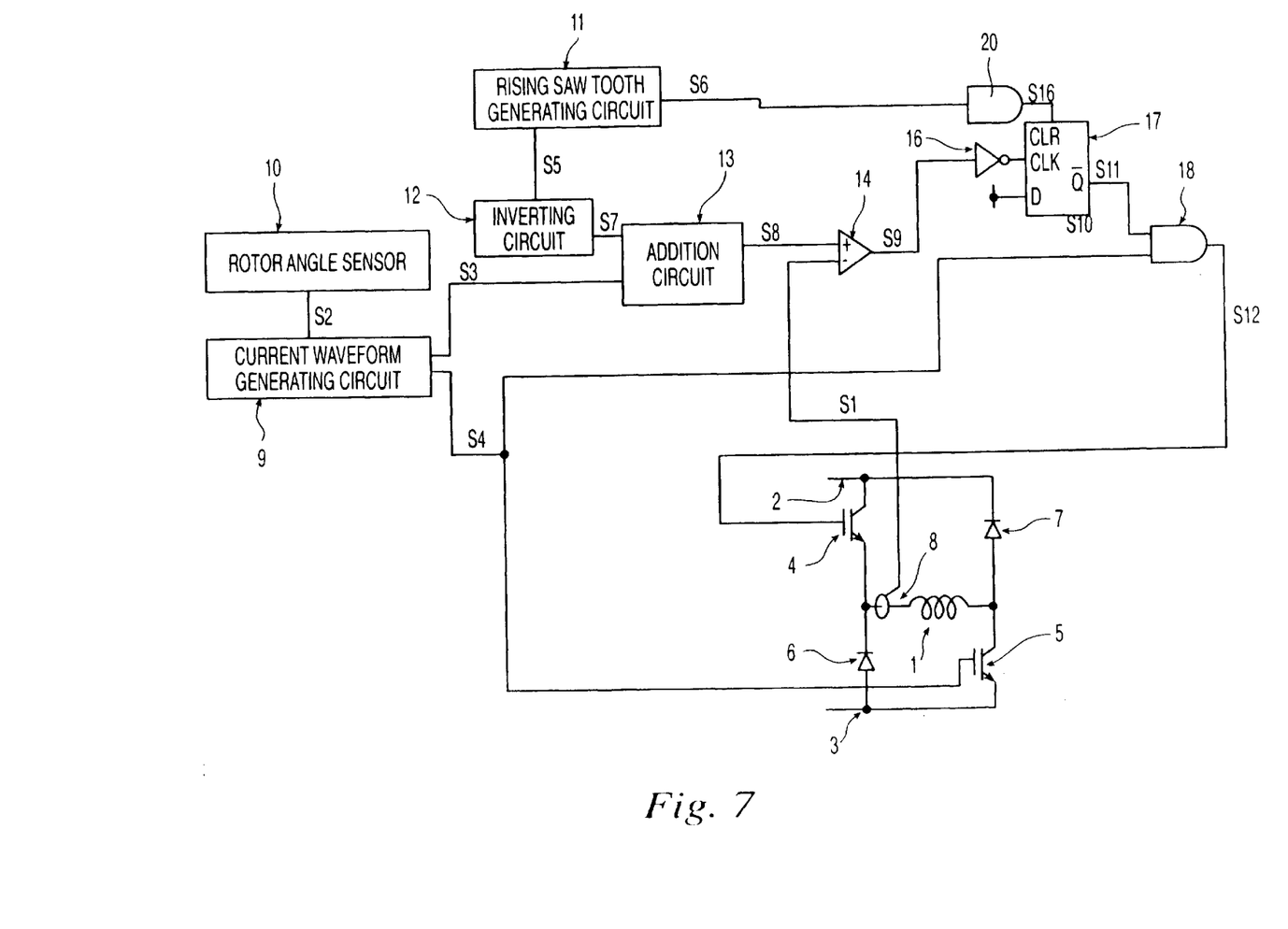
FIG. 7 is a block diagram showing the structure of a fifth embodiment of a controller for chopped electricity in accordance with the present invention.

FIG. 7 shows a structure of the controller according to a fifth embodiment of the present invention. In this fifth embodiment, the controller is utilized for controlling the current flowing through a first phase coil 1 of a switched reluctance motor having three phase coils. The fifth embodiment differs from the first embodiment shown in FIG. 1 only in the following structures. In the fifth embodiment, the binary signal S4 which is supplied from the current waveform generating circuit 9 is supplied to a gate terminal of the second switching element 5 and one of input terminals of the AND gate 18. Further, the reference chopping timing signal S6 and the output signal S9 of the comparator circuit 19 are supplied to two input terminals of an AND gate 20 and a binary signal 816 supplied from the AND gate 20 is supplied to an input terminal CLK of a flip-flop 22.

In the condition in which the reference chopping timing signal S6 is in the high level H, the binary signal S16 reaches the high level H when the binary signal S9 is in the high level H, and the binary signal S16 changes to the low level L when the binary signal S9 changes from the high level H to the low level L. Accordingly, when the signal S9 changes from the high level H to the low level L and the signal S11 changes from the high level H to the low level L between the adjacent two reference chopping timings, the signal S12 is changed from the high level H to the low level L. After that, when the later one of the adjacent two reference chopping timings comes, if the signal S9 is in the high level H, the signal S12 changes to the high level H. However, when the later one of the adjacent two reference chopping timings comes, if the signal S9 is in the low level L, the signal S12 is maintained to the low level L. In this fifth embodiment, when the reference chopping timing comes, the compensation reference current signal S8 is rapidly increased and thus the changing of the signal S9 from the low level L to the high level H is hastened. As a result, it prevents the period of ON/OFF, control for feeding the current to the coil 1 from becoming longer than the period of the reference chopping timing and thereby it prevents the objectionable acoustic noise from being generated.

Figure 8:
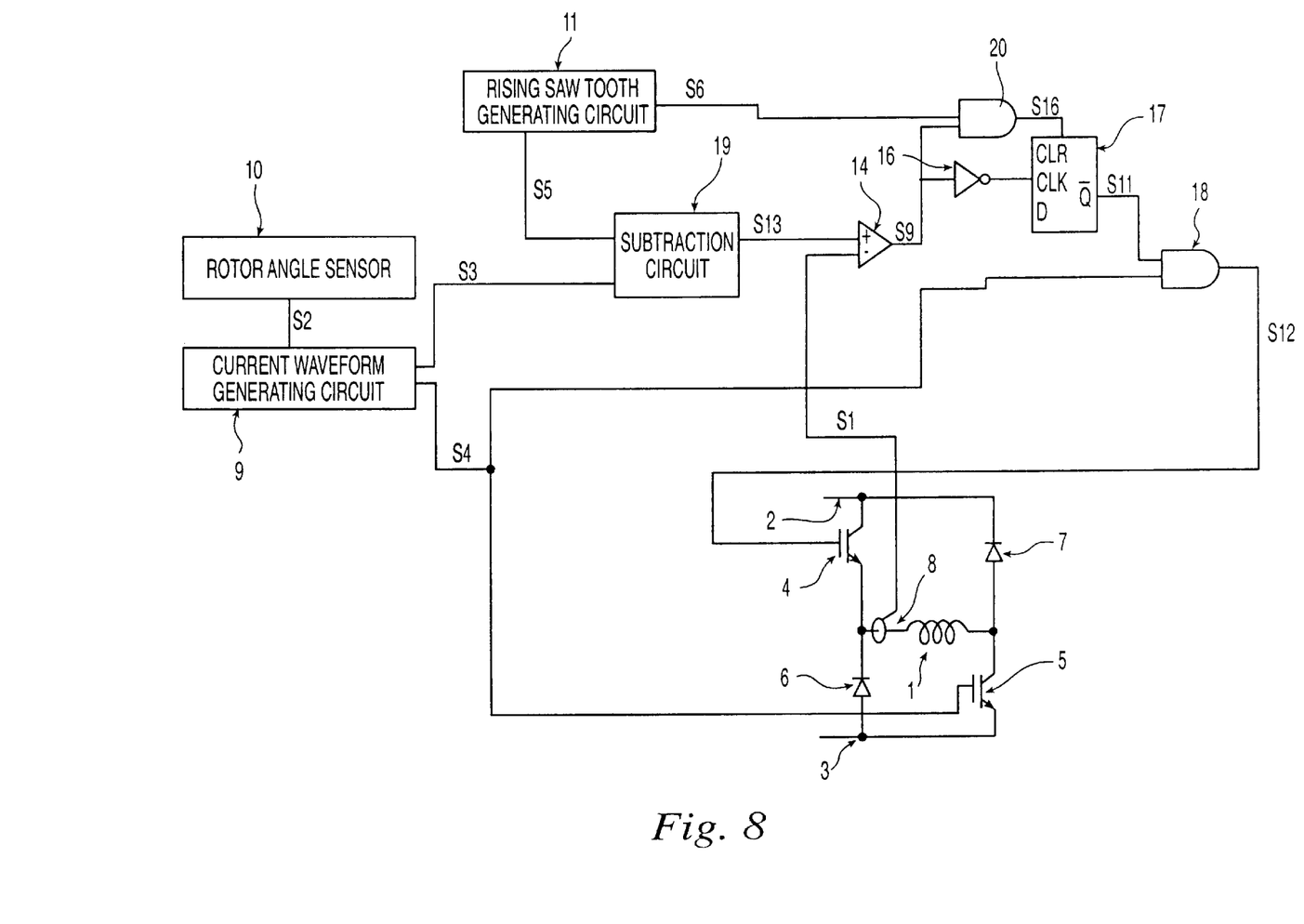
FIG. 8 is a block diagram showing the structure of a sixth embodiment of a controller for chopped electricity in accordance with the present invention.

FIG. 8 shows a structure of the controller according to a sixth embodiment of the present invention. In this sixth embodiment, the controller is utilized for controlling the current flowing through a first phase coil 3 of a switched reluctance motor having three phase coils. The sixth embodiment differs from the fifth embodiment shown in FIG. 7 only in the following structures. In the sixth embodiment, the rising saw tooth signal S5 is subtracted from the reference current signal S3 by a subtraction circuit 19 and a compensation reference current signal S13 is produced as a result of this subtraction. Further, the compensation reference current signal S13 is compared with the actual current signal S3 by the comparator circuit 14 and a binary signal S9 is produced as the result of this comparison. In this sixth embodiment, it is posslbe to obtain the same effects as the above fifth embodiment.

Figure 9:
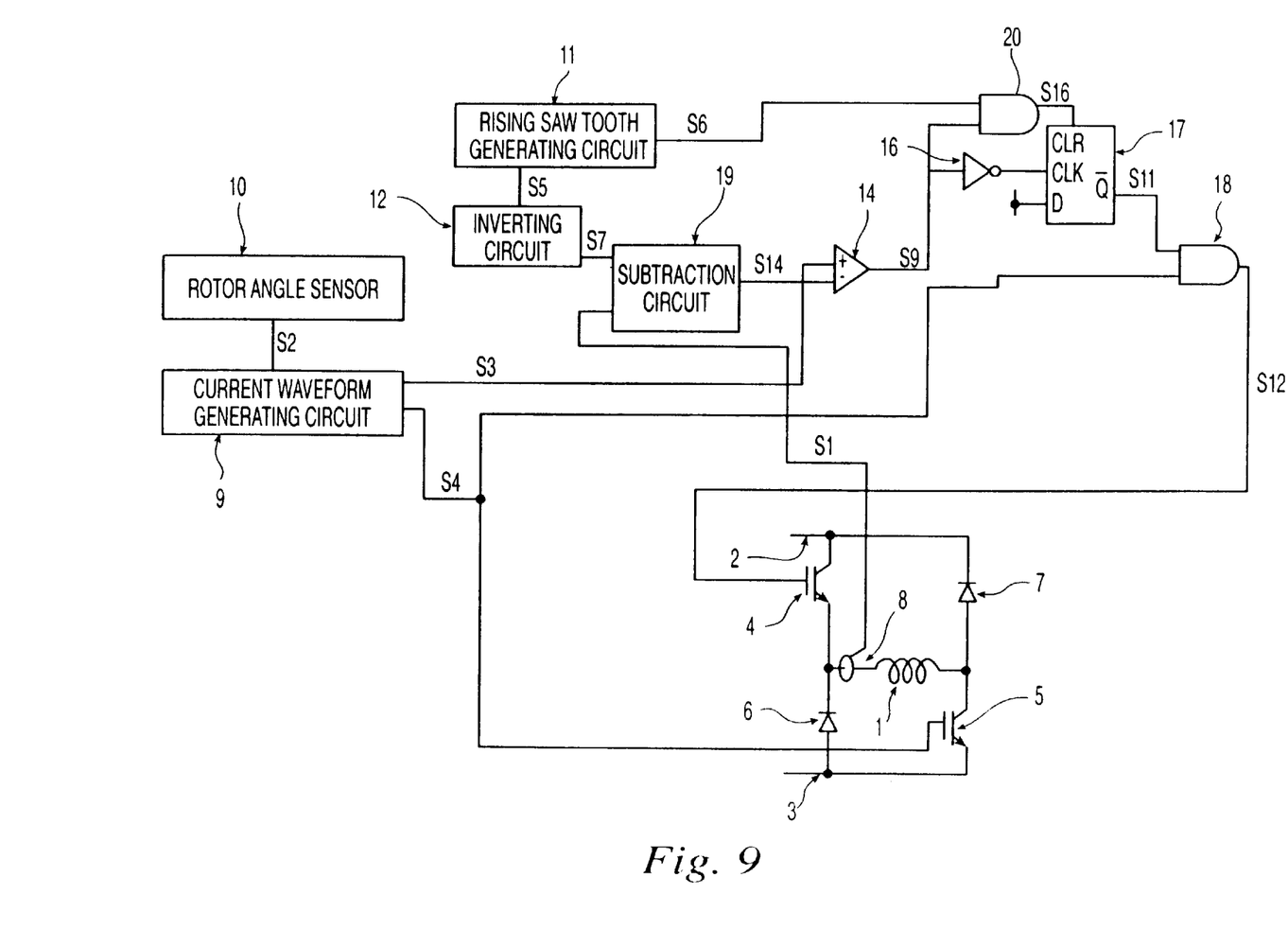
FIG. 9 is a block diagram showing the structure of a seventh embodiment of a controller for chopped. electricity in accordance with the present invention.

FIG. 9 shows a structure of the controller according to a seventh embodiment of the present invention. In this seventh embodiment, the controller is utilized for controlling the current flowing through a first phase coil 1 of a switched reluctance motor having three phase coils. The seventh embodiment differs from the fifth embodiment shown in FIG. 7 only in the following structures. In the seventh embodiment, the descending saw tooth signal S7 is subtracted from the actual current signal S1 by a subtraction circuit 19 and a compensation actual current signal S14 is produced as the result of this subtraction. Further, the compensation actual current signal S14 is compared with the reference current signal S3 by the comparator circuit 14 and a binary signal S9 is produced as the result of this comparison. In this seventh embodiment, it is possible to obtain the same effects as the above fifth embodiment.

Figure 10:
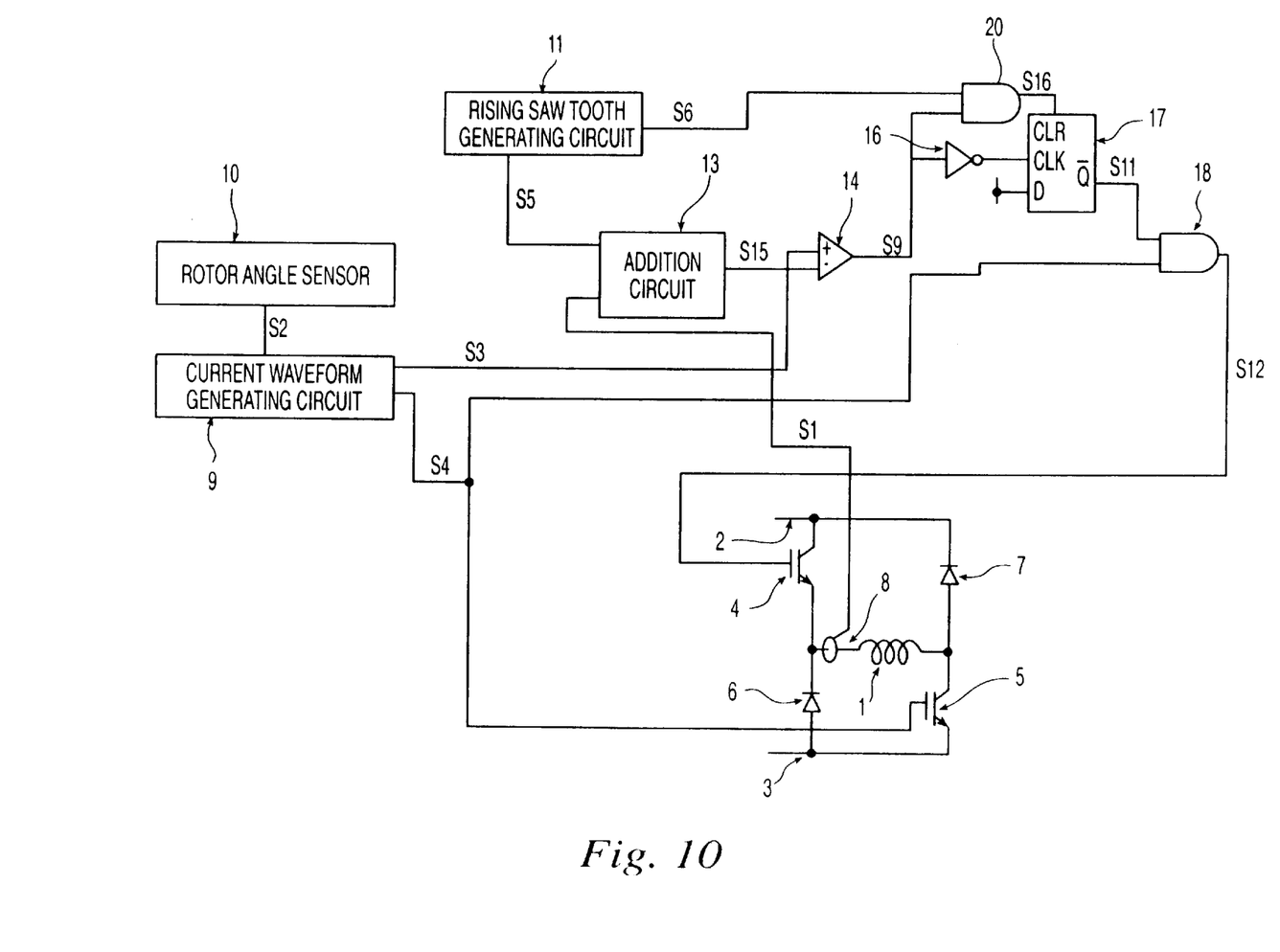
FIG. 10 is a block diagram showing the structure of a eighth embodiment of a controller for chopped electricity in accordance with the present invention.

FIG. 10 shows a structure of the controller according to a eighth embodiment of the present invention. In this eighth embodiment, the controller is utilized for controlling the current flowing through a first phase coil 1 of a switched reluctance motor having three phase coils. The eighth embodiment differs from the first embodiment shown in FIG. 1 only in the following structures. In the eighth embodiment, the rising saw tooth signal S5 is added to the actual current signal S1 by an addition circuit 13 and a compensation actual current signal S15 is produced as the result of this addition. Further, the compensation actual current signal S15 is compared with the reference current signal S3 by a comparator circuit 14 and a binary signal S9 is produced as the result of this comparison. In this eighth embodiment, it is possible to obtain the same effects as the above first embodiment.

As mentioned above, according to the present invention, it prevents the period of ON/OFF control for feeding the current to the coil 1 from becoming longer than the period of the reference chopping timing whose frequency is slightly higher than the human audible frequency range and therefore it effectively prevents the objectionable acoustic noise from being generated.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a descending saw tooth signal synchronizing with the reference chopping timing and having a constant amplitude, means for generating a compensation reference current signal adding the descending saw tooth signal to the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal, enable flag signal generating means for generating an enable flag signal which is set to a first level whenever the binary signal is turned to off from on status and which is set to a second level whenever the reference chopping timing comes, and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

2. A controller for feeding chopped electricity as recited in claim 1, wherein the amplitude of the saw tooth signal is less than an offset level of the actual current signal.

3. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation reference current signal by subtracting the rising saw tooth signal from the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal, enable flag signal generating means for generating an enable flag signal which is set to a first level whenever the binary signal is turned to off from on status and which is set to a second level whenever the reference chopping timing comes, and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

4. A controller for feeding chopped electricity as recited in claim 3, wherein the amplitude of the saw tooth signal is less than an offset level of the actual current signal.

5. A controller for feeding chopped electricity comprising:

means for generating an actual current signal shows a current actually flowing through a load, means for generating a reference current signal which generates the reference current signal showing a reference current value that should flow through the load, timing generating means for generating a reference chopping timing having a constant period, means for generating a saw tooth signal which generates a descending saw tooth signal synchronizing with the reference chopping timing and having a constant amplitude, means for generating a compensation actual current signal by subtracting the descending saw tooth signal from the actual current signal, binary signal generating means for generating a binary signal which is set to a first level when the compensation actual current signal falls below the reference current signal by the result of the comparison between the compensation actual current signal and the reference current signal and which is set to a second level when the compensation actual current signal is greater than the reference current signal, enable flag signal generating means for generating an enable flag signal which is set to a first level whenever the binary signal is turned to off from on status and which is set to a second level whenever the reference chopping timing comes, and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

6. A controller for feeding chopped electricity as recited in claim 5, wherein the amplitude of the saw tooth signal is legs than an offset level of the actual current signal.

7. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation actual current signal by adding the rising saw tooth signal to the actual current signal, binary signal generating means for generating a binary signal, which is set to a first level when the compensation actual current signal falls below the reference current signal by the result of the comparison between the compensation actual current signal and the reference current signal and which is set to a second level when the compensation actual current signal is greater than the reference current signal, enable flag signal generating means for generating an enable flag signal which is set to a first level whenever the binary signal is turned to off from on status and which is set to a second level whenever the reference chopping timing comes, and switching means which turns the feeding of the current to the load from on status to off status in response to the switching of the binary signal from the first level to the second level when the enable flag signal is in the first level and which turns the feeding of the current to the load from off status to on status in response to the switching of the binary signal from the second level to the first level when the enable flag signal is in the second level.

8. A controller for feeding chopped electricity as recited in claim 7, wherein the amplitude of the saw tooth signal is less than an offset level of the actual current signal.

9. A controller for feeding chopped electricity comprising:

means for generating an actual current signal which shows a current actually flowing through a load, means for generating a reference current signal which shows a reference current value that should be flown through the load, timing generating means for generating a reference chopping timing having a constant period, means for generating a saw tooth signal which generates a descending saw tooth signal synchronizing with the reference chopping timing and having a constant amplitude, means for generating a compensation reference current signal by adding the descending saw tooth signal to the reference current signal, binary signal generating means for generating a binary signal which is set to a first level when the actual current, signal falls below the compensation reference current signal by the result of the comparison between the actual current signal and the compensation reference current signal and which is set to a second level when the actual current signal is greater than the compensation reference current signal, and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

10. A controller for feeding chopped electricity as recited in claim 9, wherein the amplitude of the saw tooth signal is less than an offset level of the actual current signal.

11. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation reference current signal by subtracting the rising saw tooth signal from the reference current signal, binary signal generating means for generating a binary signal which is set to a first level when the actual current signal falls below the compensation reference current signal by the result of the comparison between the actual current signal and the compensation reference current signal and which is set to a second level when the actual current signal is greater than the compensation reference current signal, and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

12. A controller for feeding chopped electricity as recited in claim 11, wherein the amplitude of the saw tooth signal is less than an offset level of the actual current signal.

13. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a descending saw tooth signal synchronizing with the reference chopping timing and having a constant amplitude, means for generating a compensation reference current signal by subtracting the descending saw tooth signal from the actual current signal, binary signal generating means for generating a binary signal which is set to a first level when the compensation actual current signal falls below the reference current signal by the result of the comparison between the compensation current signal and the reference current signal and which is set to a second level when the compensation actual current signal is greater than the reference current signal, and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

14. A controller for feeding chopped electricity as recited in claim 13, wherein the amplitude of the saw tooth signal is less than an offset level of the actual current signal.

15. A controller for feeding chopped electricity comprising:

means for generating an actual current signal which shows a current actually flowing through a load, means for generating a reference current signal which shows a reference current value that should flow through the load, timing generating means for generating a reference chopping timing having a constant period, means for generating a saw tooth signal which generates a rising saw tooth signal synchronizing with the reference chopping timing and having a constant amplitude, means for generating a compensation reference current signal by adding the rising saw tooth signal to the actual current signal, binary signal generating means for generating a binary signal which is set to a first level when the compensation actual current signal falls below the reference current signal by the result of the comparison between the compensation current signal and the reference current signal and which is set to a second level when the compensation actual current signal is greater than the reference current signal, and switching means which turns the feeding of the current to the load from on status to off status in response to the switching of the binary signal from the first level to the second level, which turns the feeding of the current to the load from off status to on status when the binary signal is in the first level at the reference chopping timing and which maintains the feeding of the current to the load to the off status when the binary signal is in the second level at the reference chopping timing.

16. A controller for feeding chopped electricity as recited in claim 15, wherein the amplitude of the saw tooth signal is less than an offset level of the actual current signal.

* * * * *

UNITED STATES PATENT AND TRADEMARK OFFICE
CERTIFICATE OF CORRECTION

PATENT NO. : 6,111,383
DATED : August 290, 2000
INVENTOR(S) : Masanori SUGIYAMA et al.

It is certified that error appears in the above-identified patent and that said Letters Patent is hereby corrected as shown below:

ON THE TITLE PAGE

Under [30] Foreign Application Priority Data:

please insert --February 27, 1998  (JP)............................10-47815--.

Signed and Sealed this

Eighth Day of May, 2001

Attest:

NICHOLAS P. GODICI

Attesting Officer  Acting Director of the United States Patent and Trademark Office